US012691816B2

(12) United States Patent (10) Patent No.: US 12,691,816 B2
Weston et al. (45) Date of Patent: Jul. 28, 2026

(54) POWERING AND ILLUMINATING A VEHICLE ACCESSORY

(71) Applicant: Ford Global Technologies, LLC, Dearborn, MI (US)

(72) Inventors: Keith Weston, Canton, MI (US); Dave D. Friske, Wolverine Lake, MI (US); Michael Joseph Niksa, Royal Oak, MI (US); John Robert Van Wiemeersch, Novi, MI (US); Brendan Diamond, Naples, FL (US); Stuart C. Salter, White Lake, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 18/901,726

(22) Filed: Sep. 30, 2024

(65) Prior Publication Data

US 2026/0091727 A1 Apr. 2, 2026

(51) Int. Cl.
| | |
|---|---|
| *B60Q 1/26* | (2006.01) |
| *B60R 16/033* | (2006.01) |
| *B62D 25/18* | (2006.01) |
| *F21V 23/00* | (2015.01) |
| *F21V 23/04* | (2006.01) |

(52) U.S. Cl.
CPC .......... *B60Q 1/2661* (2013.01); *B60R 16/033* (2013.01); *F21V 23/002* (2013.01); *F21V 23/006* (2013.01); *F21V 23/0435* (2013.01); *F21V 23/0492* (2013.01); *B60Q 2400/10* (2013.01); *B62D 25/18* (2013.01)

(58) Field of Classification Search
CPC ... B60R 1/2661; B60R 16/033; F21V 23/002; F21V 23/006; F21V 23/0435; F21V 23/0492
USPC ........................................................ 362/548
See application file for complete search history.

(56) References Cited

U.S. PATENT DOCUMENTS

| | | | |
|---|---|---|---|
| 7,079,042 B2 | 7/2006 | Reim | |
| 7,112,251 B2 | 9/2006 | Majumdar et al. | |
| 7,264,385 B2 | 9/2007 | Thomas et al. | |
| 9,016,912 B1* | 4/2015 | Gustafson ............ | B60Q 1/0088 |
| | | | 362/500 |
| 9,227,562 B2 | 1/2016 | Fitch et al. | |
| 9,783,103 B2* | 10/2017 | Alshalabi ................. | B60Q 3/80 |
| 10,894,478 B2* | 1/2021 | Masuda .................. | B60L 53/62 |
| 2008/0105344 A1 | 5/2008 | Losey et al. | |

(Continued)

FOREIGN PATENT DOCUMENTS

| | | |
|---|---|---|
| JP | 6706421 B2 | 6/2020 |
| KR | 1020240154108 A | 10/2024 |

*Primary Examiner* — Bryon T Gyllstrom
(74) *Attorney, Agent, or Firm* — Burr & Forman; Lorne Forsythe

(57) ABSTRACT

A vehicle accessory may include an accessory body configured to operably couple to the vehicle, a power transfer assembly configured to operably couple a first power source at the vehicle to the accessory body to transfer electrical power to the accessory body, and an electroluminescent material disposed at the accessory body to emit light when powered. The power transfer assembly may transfer the electrical power to the accessory body responsive to installation in or operation of the vehicle, and the electrical power may excite the electroluminescent material to emit light.

19 Claims, 8 Drawing Sheets

(56) References Cited

U.S. PATENT DOCUMENTS

| | | | |
|---|---|---|---|
| 2013/0335997 A1* | 12/2013 | Roberts | G09F 13/06 |
| | | | 362/583 |
| 2015/0360604 A1* | 12/2015 | Cameron | B60R 19/50 |
| | | | 40/204 |
| 2016/0355124 A1* | 12/2016 | Cervantes Guarneros | |
| | | | B60Q 3/80 |
| 2018/0306423 A1* | 10/2018 | Ando | F21V 7/10 |
| 2019/0143888 A1* | 5/2019 | Schaye | B60Q 1/2603 |
| | | | 315/79 |
| 2021/0325661 A1* | 10/2021 | Filo | H10F 77/90 |
| 2021/0329753 A1 | 10/2021 | Richardson et al. | |
| 2024/0092280 A1* | 3/2024 | Musale | B60R 13/005 |
| 2024/0140306 A1* | 5/2024 | Anderson | B60Q 3/60 |
| 2024/0154108 A1 | 5/2024 | Geshi et al. | |

\* cited by examiner

Legend

.......... Hidden from current view

— . — Control Circuit

| Legend | |
|---|---|
| ---------- | Hidden from current view |
| — . — | Control Circuit |

800

POWERING AND ILLUMINATING A VEHICLE ACCESSORY

TECHNICAL FIELD

Example embodiments generally relate to vehicle accessories and, more particularly, relate to an illuminated vehicle accessory.

BACKGROUND

Vehicle accessories have often been customized and added to a vehicle to increase functionality and aesthetic appeal, as well as display desired patterns and designs. In recent years, illuminated vehicle accessories have been increasingly popular. Typical illuminated vehicle accessories utilize light emitting diodes (LED)s and other wired light emitting elements to provide the necessary illumination.

However, LEDs and other wired light emitting elements restrict the vehicle accessory construction and are difficult to implement in many types of vehicle accessories. As such, an illuminated vehicle accessory that utilizes an electroluminescent material and additive manufacturing production process may be desired.

BRIEF SUMMARY OF SOME EXAMPLES

In accordance with an example embodiment, a vehicle accessory for a vehicle may be provided. The vehicle accessory may include an accessory body configured to operably couple to the vehicle, a power transfer assembly configured to operably couple a first power source at the vehicle to the accessory body to transfer electrical power to the accessory body, and an electroluminescent material disposed at the accessory body to emit light when powered. The power transfer assembly may transfer the electrical power to the accessory body responsive to installation in or operation of the vehicle, and the electrical power may excite the electroluminescent material to emit light.

In another example embodiment, a vehicle accessory for a vehicle may be provided. The vehicle accessory may include an accessory body configured to operably couple to the vehicle, a power transfer assembly configured to operably couple a first power source at the vehicle to the accessory body to transfer electrical power to the accessory body, an electroluminescent material disposed at the accessory body to emit light when powered, and a control circuit disposed at the accessory body and configured to transfer the electrical power to the electroluminescent material. The power transfer assembly may transfer electrical power to the accessory body responsive to installation in or operation of the vehicle, and the electrical power may excite the electroluminescent material to emit light. The control circuit may be printed via conductive ink printing.

In a further example embodiment, a vehicle accessory for a vehicle may be provided. The vehicle accessory may include an accessory body configured to operably couple to the vehicle, a power transfer assembly configured to operably couple a first power source at the vehicle to the accessory body to transfer electrical power to the accessory body, an electroluminescent material disposed at the accessory body to emit light when powered, and a control circuit disposed at the accessory body and configured to transfer the electrical power to the electroluminescent material. The power transfer assembly may transfer electrical power to the accessory body responsive to installation in or operation of the vehicle, and the electrical power may excite the electroluminescent material to emit light. The control circuit may be printed via conductive ink printing.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Figure 1:
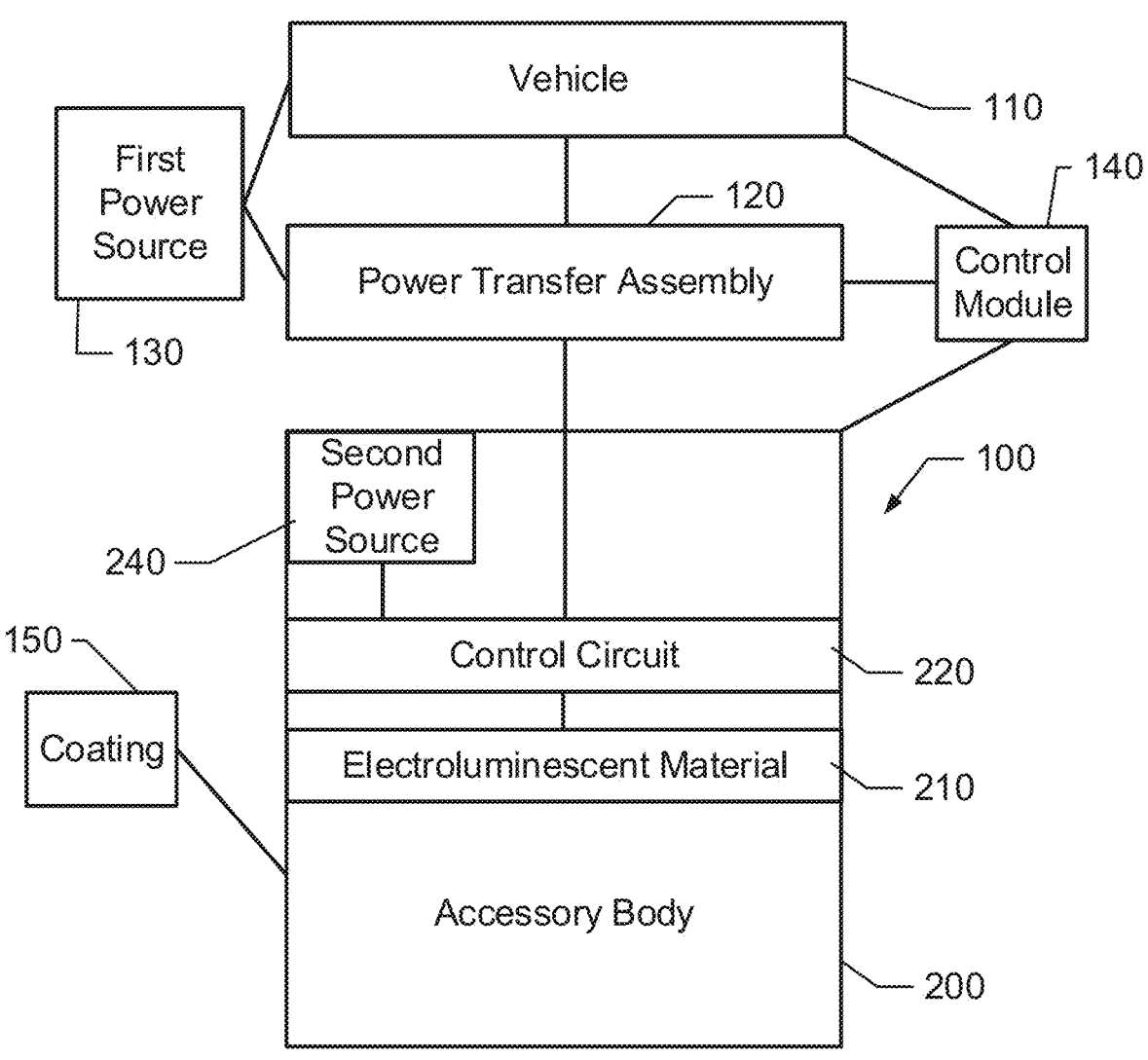
FIG. 1 depicts a block diagram of the vehicle accessory for a vehicle in accordance with an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

Additionally, as used herein, terminology such as "about" and "substantially" should be understood to be definite approximations that account for variations in measurements that cannot be, or as one of skill in the art would appreciate, normally are not, measured precisely. Thus, for example, a parameter that is "about" or "substantially" a given value or a given characteristic should be understood to be sufficiently close to the given value or given characteristic such that performance of the object or product to which the parameter applies, from the perspective of one with ordinary skill in the art, is the same as though the object or product had precisely the given value or characteristic.

Some example embodiments described herein may address the issues described above. In this regard, for example, some embodiments may provide a vehicle accessory for a vehicle to increase vehicle functionality. As a result, the vehicle accessory may provide illumination to augment the vehicle.

FIG. 1 illustrates a block diagram of a vehicle accessory 100 for a vehicle 110 in accordance with an example embodiment. In some cases, the vehicle 110 may include a chassis. In an example embodiment, the chassis may be a frame or body of the vehicle 110. The chassis or frame may support and/or may form the foundation structure of the vehicle 110. In some cases, the chassis and/or frame may be formed of one or more casted or welded metal subframes or may be an unibody construction, and a suspension element may be operably coupled to the chassis or frame to help operably couple a wheel assembly to the chassis or frame.

In an example embodiment, as seen in FIG. 1, the vehicle accessory 100 may be added to the vehicle 110. The vehicle accessory 100 may include a wide variety of different accessory types for different locations of the vehicle 110. For example, in some cases, the vehicle accessory 100 may be a floor mat, mud flap, wheel well liner, cargo mat, or cargo liner. The vehicle accessory 100 may not be limited to the aforementioned list of accessory types, and may be any number of accessory types that integrate with and/or operably couple with the vehicle 110. In some cases, the vehicle 110 may include multiple instances of the vehicle accessory 100. The multiple instances of the vehicle accessory 100 may include multiple instances of the same type of vehicle accessory 100 or may include a variety of different types of the vehicle accessory 100.

Often, operators and customers desire the vehicle accessory 100 to include illumination to highlight varying patterns, logos, or other designs of the vehicle accessory 100. As such, the vehicle accessory 100 may be operably coupled to a power transfer assembly 120 capable of providing electrical power to enable illumination of the vehicle accessory 100. The power transfer assembly 120 may be operably coupled to the vehicle 110 and/or a first power source 130. The first power source 130 may be a number of different types of power sources. In some cases, the first power source 130 is an onboard power source of the vehicle 110 and provides electrical power to the power transfer assembly 120. The onboard power source of the vehicle 110 may include a primary battery of the vehicle 110 or a battery for a different system or assembly of the vehicle 110 (i.e., suspension assembly, control systems, etc.). In an example embodiment, the first power source 130 may be included within the power transfer assembly 120.

The power transfer assembly 120 may transfer the electrical power from the first power source 130 to the vehicle accessory 100 via numerous different ways. For example, the power transfer assembly 120 may transfer the electrical power via a wired connection to the vehicle accessory 100. The wired connection may operably couple to an accessory body 200 of the vehicle accessory 100. DC contact via a connector is another example of the wired connection. In some cases, the power transfer assembly 120 may transfer the electrical power to the vehicle accessory 100 via induction. Inductive power transfer may utilize a magnetic field to transfer the electrical power without an explicit or wired physical electrical connection. For example, the power transfer assembly 120 may transfer the electrical power from the first power source 130 to the vehicle accessory 100 via AC induction.

Inductive power transfer may be a type of wireless power transfer methodology utilized by the power transfer assembly 120. In an example embodiment, the power transfer assembly 120 may include other wireless power transfer methodology. Another wireless power transfer methodology may use a radio frequency (RF) power element. The RF power element may be a wireless power transfer element that picks up low-level radio frequency waves from a source and converts the wave's energy to the electrical power.

A control module 140 may be operably coupled to the vehicle accessory 100, the power transfer assembly 120, and/or the vehicle 110 in some cases, and the operable coupling may be provided via a variety of methods. The control module 140 may utilize wired or wireless communications to communicate and receive information from vehicle components. In some cases, the control module 140 may receive information from other vehicle control modules connected to the vehicle 110 or external control modules (i.e., databases, service centers, subscription providers, etc.).

In an example embodiment, the control module 140 may be a controller. In some cases, the control module 140 may include one or more control modules (i.e., sub-control modules or operably coupled to other control modules). The control module 140 may include processing circuitry that includes a processor and memory. The processing circuitry may be configured to provide electronic control of the inputs to one or more functional units of the vehicle accessory 100 and to process data received at or generated by the one or more functional units of the vehicle accessory 100. Thus, the processing circuitry may be configured to perform data processing, control function execution and/or other processing and management services according to an example embodiment. In some embodiments, the processing circuitry may be embodied as a semiconductor chip or chip set. In other words, the processing circuitry may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The processing circuitry may therefore, in some cases, be configured to implement an embodiment of the present invention on a single chip or as a single "system on a chip." As such, in some cases, a chip or chipset may constitute means for performing one or more operations for providing the functionalities described herein. In an example embodiment, other vehicle control modules may include similar processing circuitry.

In some cases, as noted above, the vehicle accessory 100 may include the accessory body 200, an electroluminescent material 210, and a control circuit 220. The accessory body 200 may form the majority of the vehicle accessory 100. The accessory body 200 may be comprised of a number of different materials depending on the type and use of the vehicle accessory 100. For example, if the vehicle accessory 100 is a floor mat or a cargo mat, the accessory body 200 may be flexible and consist of a rubber or rubber-like material or flexible plastic. If the vehicle accessory 100 is a wheel well liner, the accessory body 200 may be made of a highly durable and/or rigid/semi-rigid material to account for increased exposure to the environment. If the vehicle accessory 100 is a mud flap, the accessory body 200 may be highly durable, as well as maintain flexibility, to ensure mud flap functionality.

The electroluminescent material 210 may be disposed at the accessory body 200. The electroluminescent material 210 may emit light when excited by the electrical power from the power transfer assembly 120. In some cases, the electroluminescent material 210 may be made of a variety of different methods and materials. For example, the electroluminescent material 210 may be via zinc sulfide compositions with different additional metal types. For instance, depending on the metal type (i.e., copper, silver, manganese, etc.) added with the zinc sulfide compositions, the color and other properties of the electroluminescent material 210.

In some cases, the electroluminescent material 210 may be integrated within a coating 150 and applied to the accessory body 200. However, in other cases, if the coating 150 is applied, but is not integrated with the electroluminescent material 210, the coating 150 may be translucent so that any light generated by the electroluminescent material 210 may pass through the coating 150 with minimal diminution. The coating 150 may be waterproof and increase the durability and functionality of the vehicle accessory 100. In an example embodiment, the electroluminescent material 210 may be integrated into other materials (i.e., plastics, fabrics, etc.) and applied to the accessory body 200. The electroluminescent material 210 may be operably coupled to an electroluminescent material electrical connector to transfer electrical power to the electroluminescent material 210. The electroluminescent material electrical connector may be integrated with the electroluminescent material 210 in the coating 150 or other materials.

The electroluminescent material 210 may receive the electrical power from the power transfer assembly 120 directly, or via the control circuit 220. In an example embodiment, the control circuit 220 may be directly operably couple to the electroluminescent material 210 via forming a wired connection. For example, the wired connection may operably couple to the electroluminescent material electrical connector to provide the electroluminescent material 210 the electrical power.

Figure 8:
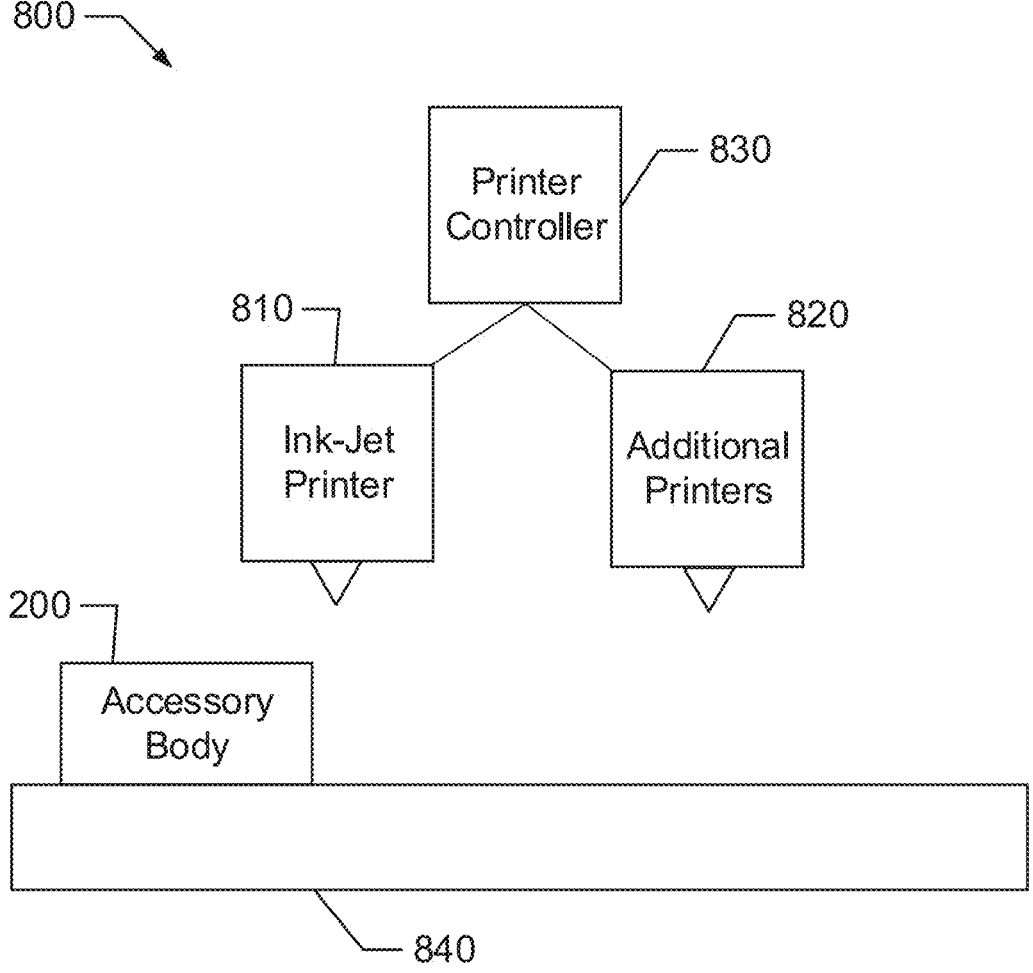
FIG. 8 illustrates a printing assembly for a vehicle accessory in accordance with an example embodiment.

The control circuit 220 may be added to the accessory body 200 via conductive ink printing. In some cases, as shown in FIG. 8, conductive ink printing may be performed via a printing system 800. The printing system 800 may use an ink jet printer 820 to apply very precise circuits to a variety of objects, including fabrics and rigid objects. The conductive ink may be a liquid-based ink. With conductive ink printing, a computer-aided design (CAD) representation of circuitry or electronics may be directly incorporated during or after the primary manufacturing or assembly process of the accessory body 200 or vehicle accessory 100 without losing specificity. Conductive ink printing may include conductive inks composed with conductive metal fillers and polymer resins. The conductive metal fillers may provide desired electrical and thermal properties. For example, the conductive metal filler may be silver, as the conductive ink needs to be easily liquefied at relatively low temperatures (i.e., 500° F. or less), while maintaining its conductivity through the printing process and application. In some cases, the temperature threshold may be higher (i.e., 2000° F. or less) depending on the application. The polymer resins may provide mechanical strength and flexibility in application of the conductive ink printing. For example, silver nitrate may be a commonly used ink for conductive ink printing. Forming the control circuit 220 via conductive ink printing may allow for increased flexibility of the accessory body 200 and vehicle accessory 100. Additionally, the conductive ink printing may provide increased ease of integration of the control circuit 220. Conductive ink printing may also be conductive ink painting.

In some cases, the control circuit 220 may be operably coupled to a second power source 240. The second power source 240 may be separate from the power transfer assembly 120 and the first power source 130. In an example embodiment, the second power source 240 may be integrated within the accessory body 200. For example, the second power source 240 may be embedded within the accessory body 200 or disposed on the accessory body 200. Thus, for example, the second power source 240 may be a local power source at the accessory body 200, e.g., a rechargeable battery, which may be recharged from the first power source 130 via the power transfer assembly 120. The control circuit 220 may utilize the electrical power from first power source 130 and the second power source 240, alone or in combination, to excite the electroluminescent material 210 to emit light. Moreover, although the control circuit 220 may merely condition, modulate, or otherwise provide power to the electroluminescent material 210 on a non-discrete or continuous basis whenever such power is available, in some cases, the control circuit 220 may restrict the provision of power to the electroluminescent material 210 unless or until a trigger signal has been received at the control circuit 220 or a trigger event is determined to have occurred by the control circuit 220.

Figure 2:
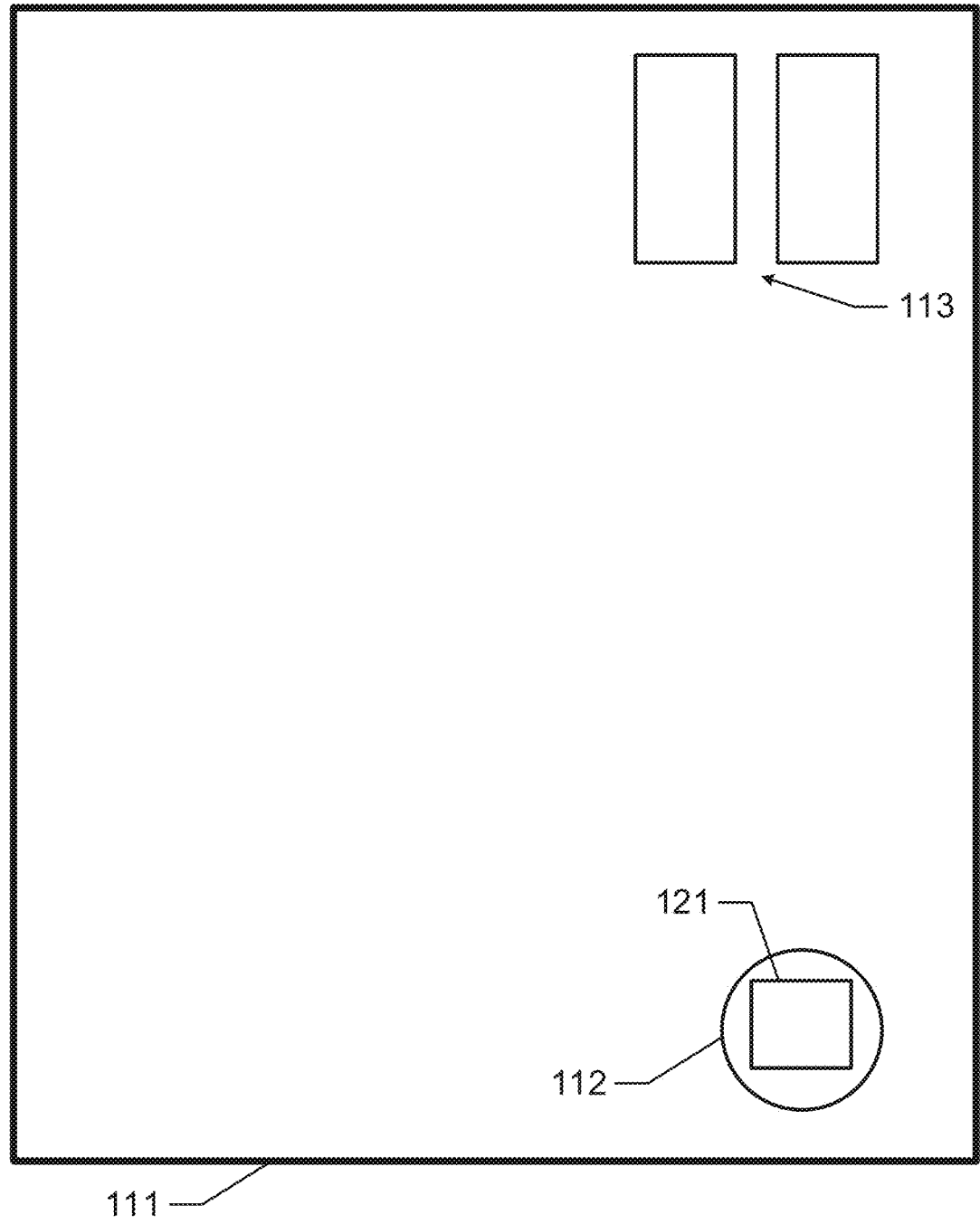
FIG. 2 illustrates a top view of a foot well in accordance with an example embodiment.
Figure 3:
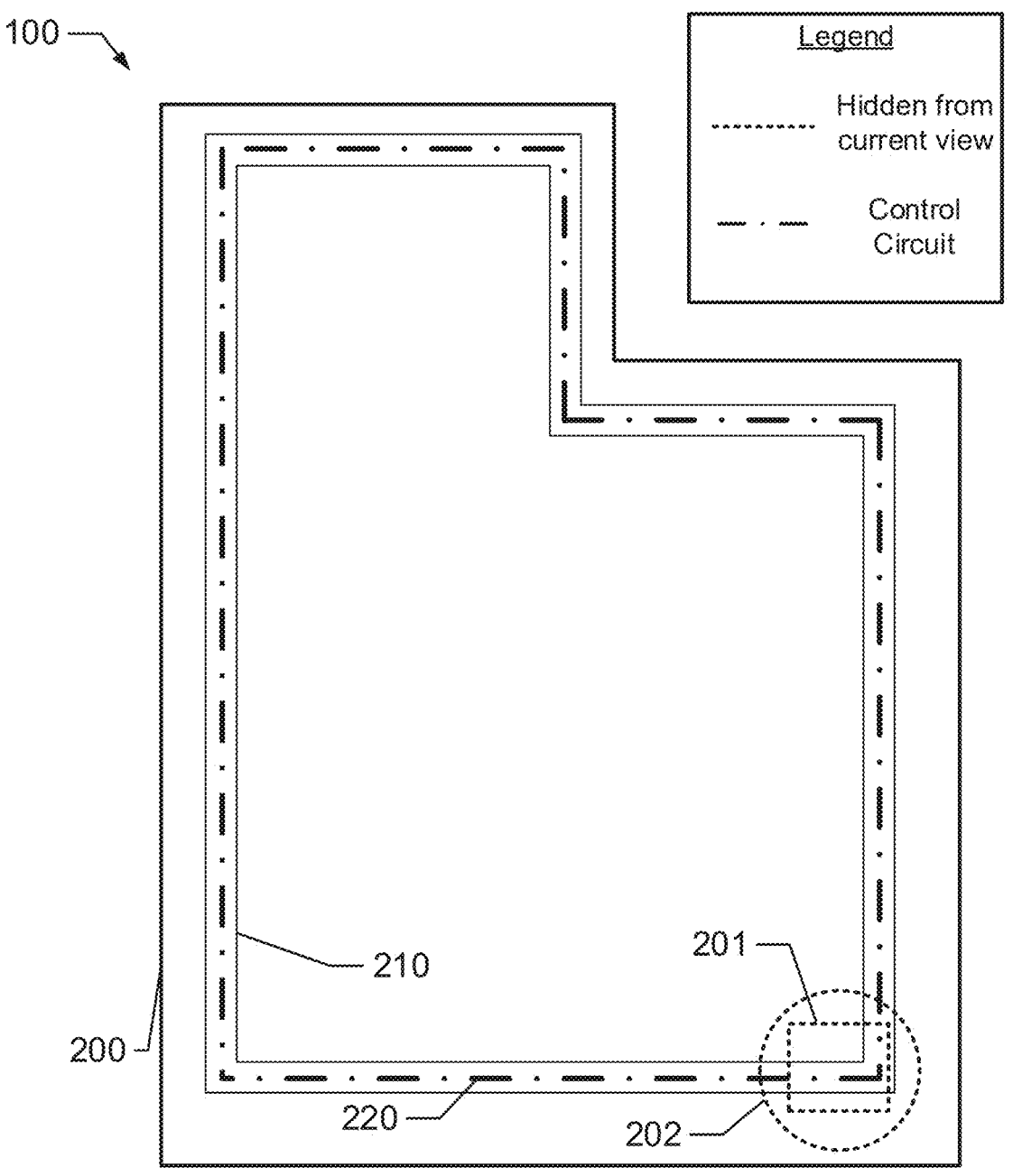
FIG. 3 depicts a top view of a vehicle accessory in accordance with an example embodiment.
Figure 4:
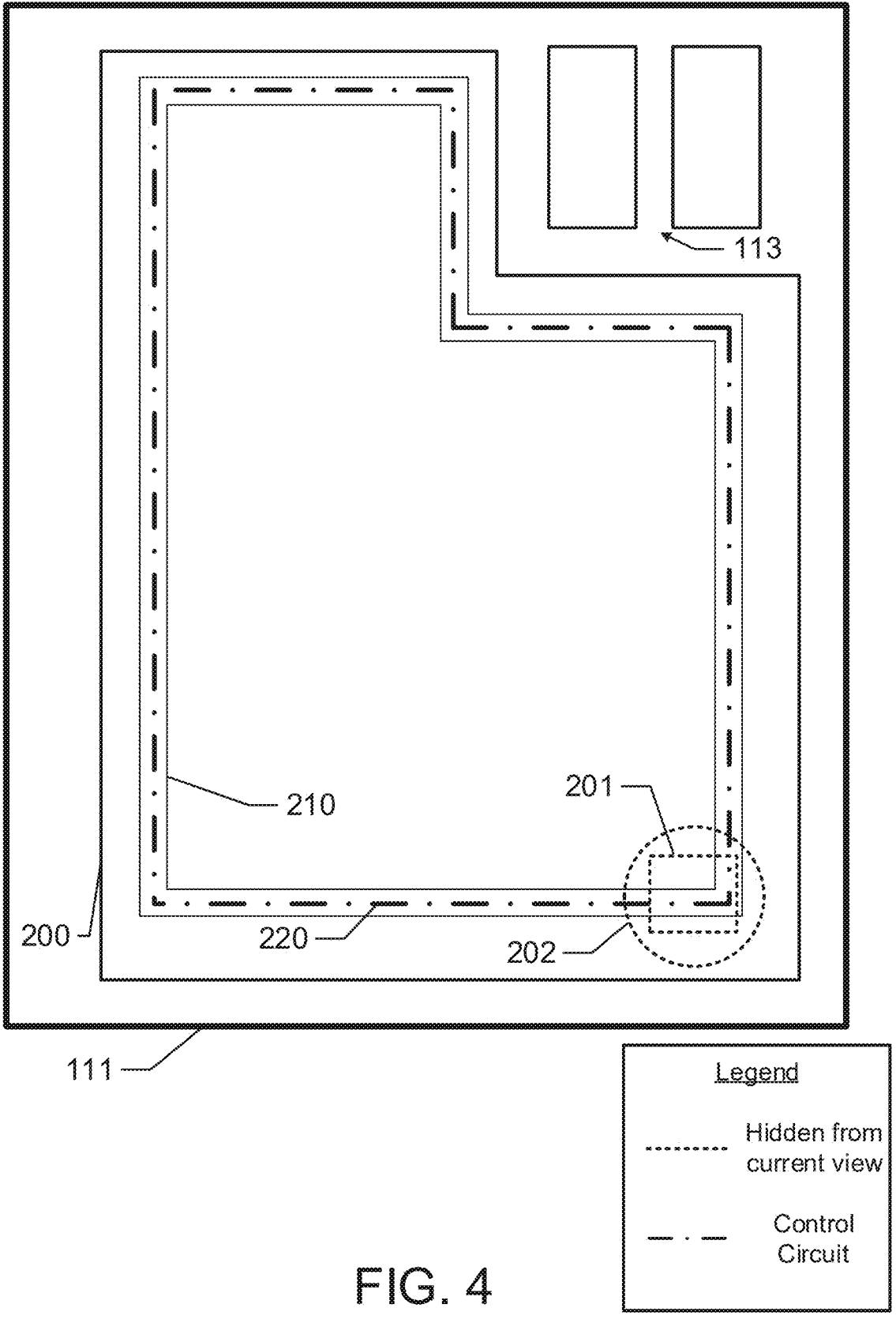
FIG. 4 illustrates a top view of a foot well and vehicle accessory in accordance with an example embodiment.
Figure 5:
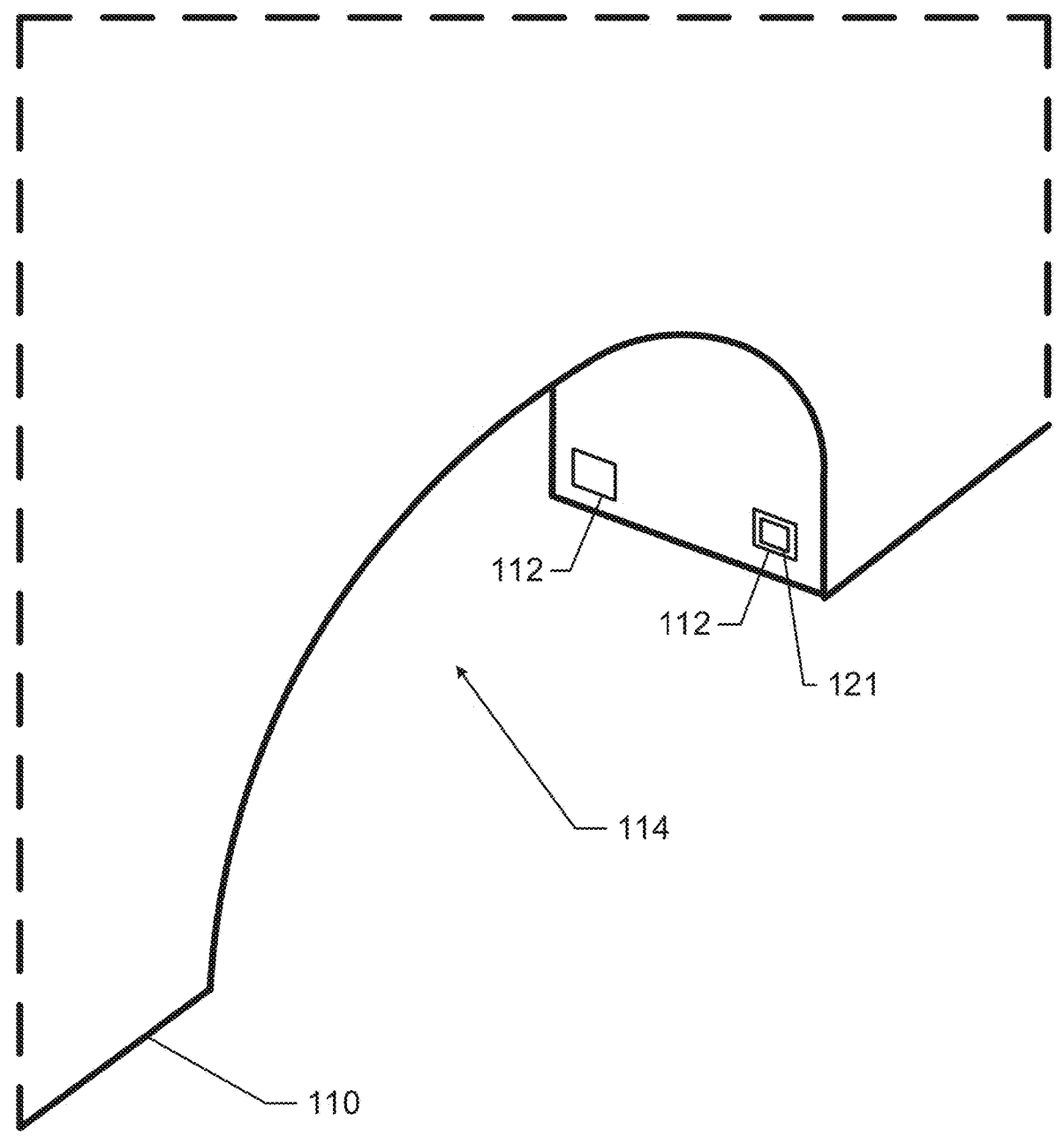
FIG. 5 depicts a perspective view of a wheel well in accordance with an example embodiment.
Figure 6:
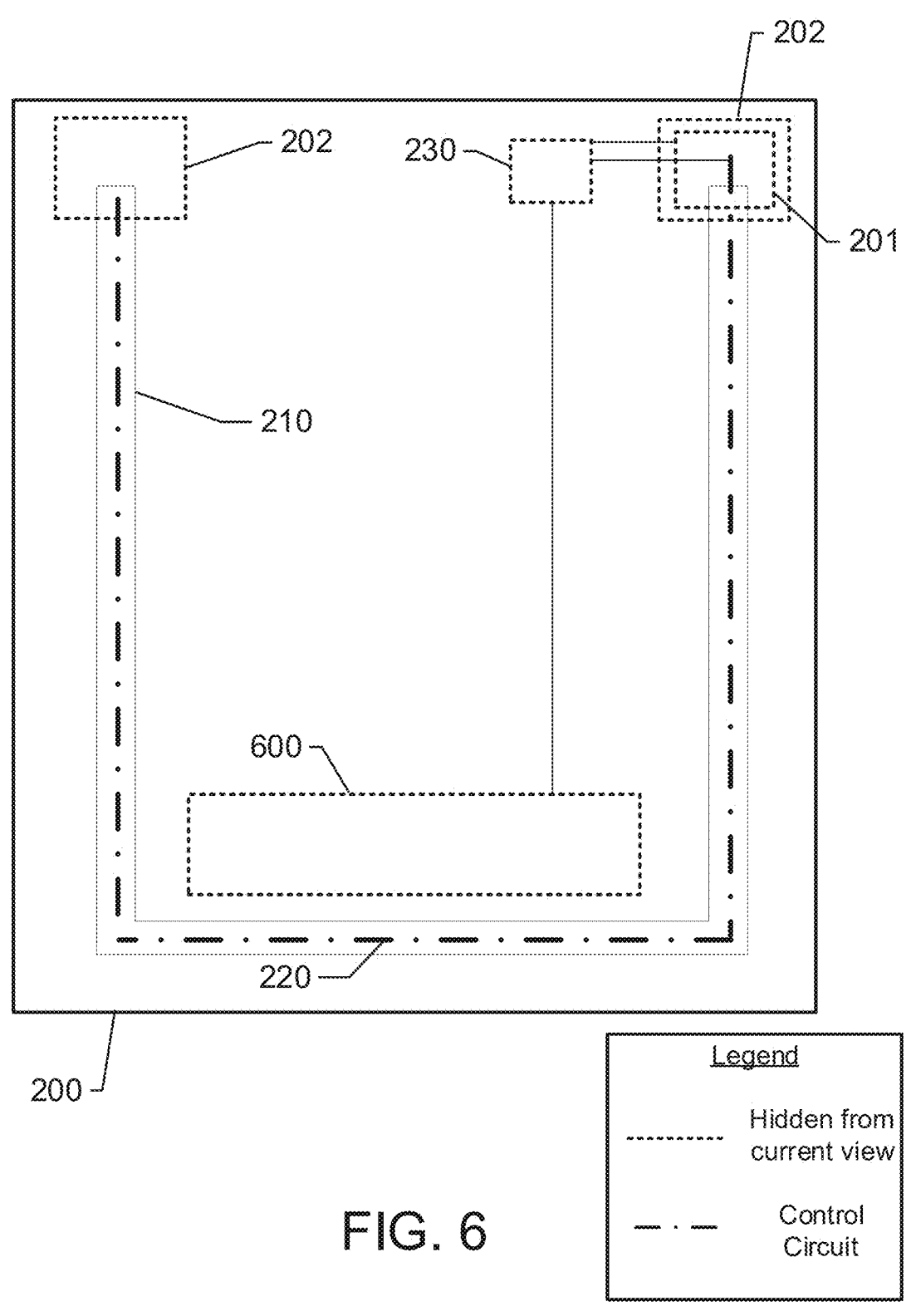
FIG. 6 illustrates a front view of a vehicle accessory in accordance with an example embodiment.
Figure 7:
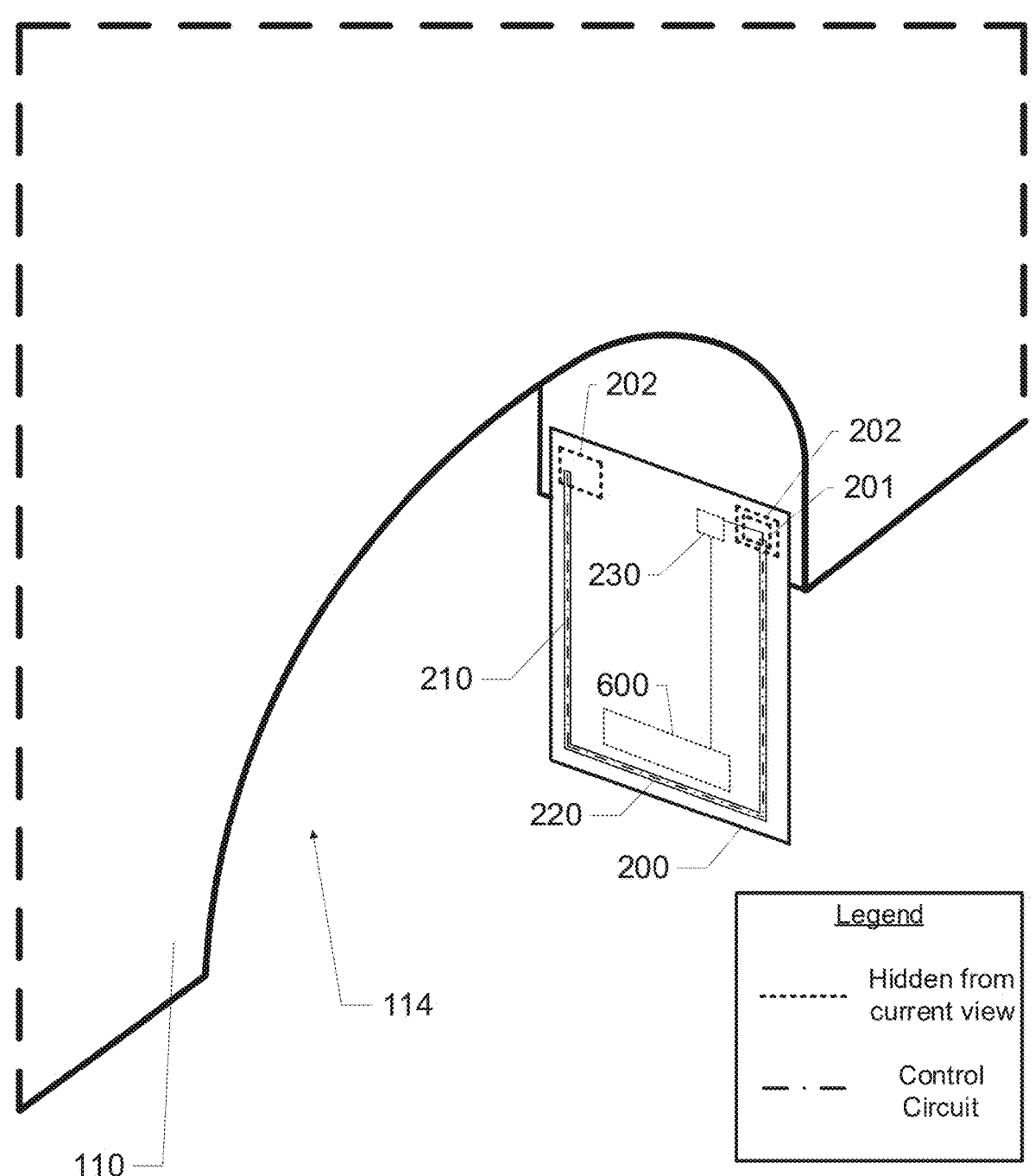
FIG. 7 depicts a perspective view of a wheel well and vehicle accessory in accordance with an example embodiment.

FIGS. 2-7 illustrate environmental context for employment of the vehicle accessory 100 of the vehicle 110 in accordance with example embodiments. FIGS. 2-4 depict an environmental context for employment of the vehicle accessory 100 as a floor mat for a foot well 111 and pedal assembly 113 of a vehicle 110. FIGS. 5-7 depict an environmental context for employment of the as a mud flap for a wheel well 114 of the vehicle 110. The dashed lines, indicating hidden from current view, depict elements that may be integrated within the vehicle accessory 100 or are disposed on a non-visible layer or side of the vehicle accessory 100.

In some cases, the power transfer assembly 120 may include a power transmitter 121. The power transmitter 121 may enable the transfer of the electrical power from the power transfer assembly 120 and the first power source 130 to the accessory body 200. In some cases, the power transmitter 121 is a type of connector or plug that directly operably couples with the accessory body 200. For example, the accessory body 200 may include a power receiver 201 that may operably couple with the power transmitter 121 and operably couple the control circuit 220 with the power transfer assembly 120. In some cases, the power receiver 201 may be a socket or other receptacle to receive the power transmitter 121 or vice versa. Thus, for example, one of the power transmitter 121 or the power receiver 201 may plug into the other.

The power transmitter 121 and the power receiver 201 may not be operably coupled via a wired connection in some cases. For example, if the power transfer assembly 120 utilizes inductive power transfer, the power transmitter 121 and power receiver 201 may transfer the electrical power wirelessly between the power transfer assembly 120 and the vehicle accessory 100 via a varying magnetic field created between the power transmitter 121 and power receiver 201. To achieve the inductive power transfer, the power transmitter 121 may include a first coil to generate a varying magnetic field, and the power receiver 201 may include a second coil to inductively generate local currents based on the varying magnetic field. A different type of the power transmitter 121 and power receiver 201 may also enable the electrical power transfer via RF power elements. In an example embodiment, the power transmitter 121 and power receiver 201 may be embedded and/or formed integrally with the vehicle 110 and the accessory body 200 respectively. For example, if the power transfer assembly 120 is transferring the electrical power wirelessly to the accessory body 200, the power transmitter 121 and power receiver 201 may be embedded within the vehicle 110 and the accessory body 200 respectively without interfering with the transfer of the electrical power.

In some cases, the power transmitter 121 and power receiver 201 may be disposed at a location of attachment between the accessory body 200 and the vehicle 110. A vehicle attachment mechanism 202 of the accessory body 200 may operably couple to the accessory attachment mechanism 112 of the vehicle 110 at the location of attachment between the accessory body 200 and the vehicle 110. In an example embodiment, the vehicle attachment mechanism 202 and accessory attachment mechanism 112 may be a button assembly, a snap-fit assembly, a hook assembly, a form-fit assembly, or any other securement assembly that assists in operably coupling the vehicle accessory 100 and the vehicle 110. The power transmitter 121 and power receiver 201 may be integrated with the accessory attachment mechanism 112 and the power transmitter 121 respectively. For example, responsive to the attachment mechanism 112 of the vehicle 110 operably coupling with the vehicle attachment mechanism 202 of the vehicle accessory 100, the power transmitter 121 and the power receiver 201 may be operably coupled to transfer the electrical power from the power transfer assembly 120. In other words, the accessory attachment mechanism 112 and the vehicle attachment mechanism 202 may help align the power transmitter 121 and the power receiver 201. In some cases, the power transmitter 121 and the power receiver 201 may be integrated/included/formed integrally with the accessory attachment mechanism 112 and the vehicle attachment mechanism 202 respectively.

The power transmitter 121 and power receiver 201 connection may be seen in FIGS. 2-4 and FIGS. 5-7. FIGS. 3-4 and FIGS. 5-7 depict the vehicle accessory 100 operably coupled to the vehicle as a floor mat and mud flap respectively. The accessory attachment mechanism 112 may operably couple with the vehicle attachment mechanism 202 to align the power transmitter 121 and the power receiver 201. The accessory attachment mechanism 112 and the vehicle attachment mechanism 202 may be disposed at different locations on the vehicle 110 and vehicle accessory 100 respectively. In some cases, the power transmitter 121 and the power receiver 201 may not be disposed directly aligned with the accessory attachment mechanism 112 and vehicle attachment mechanism 202, but the power transmitter 121 and power receiver 201 may still be aligned responsive to the operably coupling of the accessory attachment mechanism 112 and the vehicle attachment mechanism 202.

In some cases, the control circuit 220 may be operably coupled directly to the power receiver 201. The control circuit 220 may run along the length of the electroluminescent material 210 to provide the necessary electrical power to excite the electroluminescent material 210 to emit light. As such, the electroluminescent material 210 and the control circuit 220 may be disposed along the length of the design or pattern desired to be illuminated on the vehicle accessory 100. For example, the pattern or design illuminated within the vehicle accessory 100 includes, but is not limited, to logos, outlines (i.e., perimeter of vehicle accessory border), and Easter eggs (dates, coordinates, etc.). In an example embodiment, the control circuit 220 may transfer electrical power to the electroluminescent material 210 without contacting the electroluminescent material 210. The control circuit 220 may transfer electrical power via creating an electrical field or via electroluminescent material electrical connector. In some cases, the control circuit 220 may be integrated within the coating 150 that includes the electroluminescent material 210.

The control circuit 220 may receive electrical power from multiple sources. In some cases, as previously described, the second power source 240 may be integrated within the vehicle accessory 100 and provide electrical power to the control circuit 220 in addition to the power transfer assembly 120. In an example embodiment, the control circuit 220 may only utilize electrical power from one of the power transfer assembly 120 or the second power source 240. For example, the vehicle accessory 100 may only require intermittent illumination and thus may only require discontinuous power from one power source to meet its required electrical power.

In some cases, the second power source 240 may be powered via or embodied as a piezoelectric element 600. The piezoelectric element 600 may utilize movement or displacement of the vehicle accessory 100 and convert the movement or displacement of the suspension element to electrical energy. In an example embodiment, the movement or displacement of the vehicle accessory 100 caused by vibrations, wind, or airflow (i.e., for a mud flap) and may be converted into electrical power via the piezoelectric element 600.

In some cases, the second power source 240 may be powered via a thermoelectric element. The thermoelectric element may utilize and convert heat to electrical energy. In an example embodiment, the second power source 240 may be powered via a radio frequency (RF) power element. The RF power element may by a wireless power transfer element that picks up low-level radio frequency waves from a source and converts the wave's energy to electrical power. The secondary power source 240 may be another battery or integrated with the vehicle accessory battery 230.

In some cases, the power transfer assembly 120 and the second power source 240 may be operably coupled to a vehicle accessory battery 230. The vehicle accessory battery 230 may be integrated within or disposed on the vehicle accessory 100. In an example embodiment, either one of or both of the power transfer assembly 120 and the second power source 240 may provide electrical power to the vehicle accessory battery 230, which may store the electrical power for powering the vehicle accessory 100. The vehicle accessory battery 230 may be operably coupled to the control circuit 220 to provide electrical power to excite the electroluminescent material 210 to emit light. In an example embodiment, the power transfer assembly 120 and/or the second power source may provide electrical power directly to the electroluminescent material 210 to utilize/activate its electroluminescent property. In this regard, the electroluminescent material 210 may emit light without the need for an explicit lighting element or LEDs. The lack of explicit lighting elements or LEDs may allow for less complexity in the construction, assembly, or installation of the vehicle accessory 100.

In some cases, the vehicle accessory 100 may still emit light when removed from the vehicle 110 and disconnected from the power transfer assembly 120. The vehicle accessory battery 230 may still provide electrical power to the vehicle accessory 100 to enable the electroluminescent material 210 to be excited to emit light. For example, if the vehicle accessory 100 is a floor mat, the floor mat may be removed and still emit light to be used as a work mat.

In an example embodiment, electrical power may only be transferred to the electroluminescent material 210 responsive to an illumination trigger. The illumination trigger may be a signal transferred by the control module 140 to the vehicle accessory 100, the power transfer assembly 120, or another control module of the vehicle 110. In some cases, the signal may be transferred automatically based on a vehicle event. For example, a vehicle event may be, but is not limited to, an operation status of the vehicle 110 (powered on, off, reverse, etc.), time of day, vehicle movement, vehicle accessory movement, or an operator input (via phone app, vehicle control interfaces, etc.). In some cases, the illumination trigger may be required to be received by the control circuit 220 to excite the control circuit 220 into allowing power to be provided from the second power source 230 (or the first power source 130) to the electroluminescent material 210.

The vehicle accessory 100 may be created via additive manufacturing. For example, the control circuit 220 and the electroluminescent material 210 may be added after the initial formation of the accessory body 200. In some cases, if the control circuit 220 and the electroluminescent material 210 are embedded within the accessory body 200, another manufacturing step may be performed to apply the coating 150 or to finish manufacturing the accessory body 200. The additive manufacturing process may utilize the printer system 800 to manufacture the vehicle accessory 100. In some cases, the ink-jet printer 810 and the additional printers 820 may be individual pieces of a larger, single printer. The ink-jet printer 810 and the additional printers 820 may also be operably coupled to and operated via a printer controller 830. In an example embodiment, the ink-jet printer 810 may add the control circuit 220 to the accessory body 200 prior to the additional printers 820 or other manufacturing methods add the electroluminescent material 210, the coating 150, and/or the remainder of the accessory body 200. In some cases, the moving apparatus 840 may move the accessory body 200 from the ink-jet printer 810 to the additional printers 820 and vice versa. The moving apparatus 840 may be a conveyer system or other device/system that may move the accessory body 200 throughout its production process.

A vehicle accessory for a vehicle may therefore be provided. The vehicle accessory may include an accessory body configured to operably couple to the vehicle, a power transfer assembly configured to operably couple a first power source at the vehicle to the accessory body to transfer electrical power to the accessory body, and an electroluminescent material disposed at the accessory body to emit light when powered. The power transfer assembly may transfer the electrical power to the accessory body responsive to installation in or operation of the vehicle, and the electrical power may excite the electroluminescent material to emit light.

The vehicle accessory for a vehicle of some embodiments may include additional features, modifications, augmentations and/or the like to achieve further objectives or enhance performance of vehicle systems. The additional features, modifications, augmentations and/or the like may be added in any combination with each other. Below is a list of various additional features, modifications, and augmentations that can each be added individually or in any combination with each other. For example, the vehicle accessory may include a control circuit disposed at the accessory body and printed via conductive ink printing which transfers the electrical power to excite the electroluminescent material to emit light. In some cases, the vehicle accessory may include a battery that receives and stores the electrical power transferred by the power transfer assembly, and the vehicle accessory may utilize the electrical power stored in the battery to excite the electroluminescent material. In an example embodiment, the vehicle accessory may include a piezoelectric element to provide electrical power to excite the electroluminescent material responsive to vibration of the accessory body. In some cases, the power transfer assembly may transfer power to the accessory body via induction. In an example embodiment, the power transfer assembly may be disposed at a location of operable coupling between the accessory body and vehicle. In some cases, the electroluminescent material may be applied on a layer of the accessory body via a coating, and the coating may be waterproof. In an example embodiment, the power transfer assembly may transfer power wirelessly to the accessory body. In some cases, the accessory body may receive the electrical power from multiple sources, the multiple sources may include the first power source at the vehicle and a second power source, and the second power source may be disposed at the accessory body. In an example embodiment, the vehicle accessory may be a cargo mat, floor mat, wheel well lining, or mud flap. In some cases, responsive to an illumination trigger, the electrical power may excite the electroluminescent material. In an example embodiment, the illumination trigger may be a signal transferred from a control module of the vehicle, and the signal may be transferred automatically based on a vehicle event. In some cases, the illumination trigger may be sent by a user of the vehicle through a remotely connected device. In an example embodiment, the power transfer assembly may be disposed at a location of the vehicle that aligns a transmitter of the power transfer assembly with a receiver of the accessory body responsive to engagement of the accessory body and the vehicle.

A vehicle accessory for a vehicle of an example embodiment may be provided. The vehicle accessory may include an accessory body configured to operably couple to the vehicle, a power transfer assembly configured to operably couple a first power source at the vehicle to the accessory body to transfer electrical power to the accessory body, an electroluminescent material disposed at the accessory body to emit light when powered, and a control circuit disposed at the accessory body and configured to transfer the electrical power to the electroluminescent material. The power transfer assembly may transfer electrical power to the accessory body responsive to installation in or operation of the vehicle, and the electrical power may excite the electroluminescent material to emit light. The control circuit may be printed via conductive ink printing.

A vehicle accessory for a vehicle of an example embodiment may be provided. The vehicle accessory may include an accessory body configured to operably couple to the vehicle, a power source disposed at the accessory body to transfer electrical power to the accessory body, an electroluminescent material disposed at the accessory body to emit light when powered, and a control circuit disposed at the accessory body and configured to transfer the electrical power to the electroluminescent material. The power source may transfer electrical power to the accessory body responsive to i installation in the vehicle, operation of the vehicle, or an illumination trigger, and the electrical power may excite the electroluminescent material to emit light. The control circuit may be printed via conductive ink printing.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to difficulties are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

What is claimed:

1. A vehicle accessory for a vehicle, the vehicle accessory comprising:
   an accessory body configured to operably couple to the vehicle;
   a power transfer assembly configured to operably couple a first power source at the vehicle to the accessory body to transfer electrical power to the accessory body; and
   an electroluminescent material disposed at the accessory body to emit light when powered;
   wherein the power transfer assembly transfers the electrical power to the accessory body responsive to installation in or operation of the vehicle,
   wherein the electrical power excites the electroluminescent material to emit light,
   wherein the vehicle accessory and the accessory body are flexible, and
   wherein a control circuit disposed at the accessory body and printed via conductive ink printing to maintain flexibility transfers the electrical power to excite the electroluminescent material to emit light.

2. The vehicle accessory of claim 1, wherein the vehicle accessory includes a battery that receives and stores the electrical power transferred by the power transfer assembly, and
   wherein the vehicle accessory utilizes the electrical power stored in the battery to excite the electroluminescent material.

3. The vehicle accessory of claim 1, wherein the vehicle accessory includes a piezoelectric element to provide electrical power via the control circuit to excite the electroluminescent material responsive to vibration of the accessory body.

4. The vehicle accessory of claim 1, wherein the power transfer assembly transfers power to the accessory body via induction and the control circuit.

5. The vehicle accessory of claim 4, wherein the power transfer assembly is disposed at a location of operable coupling between the accessory body and vehicle.

6. The vehicle accessory of claim 1, wherein the electroluminescent material is applied on a layer of the accessory body via a coating, and
   wherein the coating is waterproof.

7. The vehicle accessory of claim 1, wherein the power transfer assembly transfers power wirelessly to the accessory body.

8. The vehicle accessory of claim 1, wherein the accessory body receives the electrical power from multiple sources,
   wherein the multiple sources include the first power source at the vehicle and a second power source disposed at the accessory body, and
   wherein the control circuit operably couples to both the first power source and the second power source.

9. The vehicle accessory of claim 1, wherein the vehicle accessory is a cargo mat, floor mat, wheel well lining, or mud flap.

10. The vehicle accessory of claim 1, wherein responsive to an illumination trigger, the electrical power excites the electroluminescent material.

11. The vehicle accessory of claim 10, wherein the illumination trigger is a signal transferred from a control module of the vehicle, and
    wherein the signal is transferred automatically based on a vehicle event.

12. The vehicle accessory of claim 10, wherein the illumination trigger is sent through a remotely connected device.

13. The vehicle accessory of claim 1, wherein the power transfer assembly is disposed at a location of the vehicle that aligns a transmitter of the power transfer assembly with a receiver of the accessory body responsive to engagement of the accessory body and the vehicle.

14. A vehicle accessory for a vehicle, the vehicle accessory comprising:
    an accessory body configured to operably couple to the vehicle;
    a power transfer assembly configured to operably couple a first power source at the vehicle to the accessory body to transfer electrical power to the accessory body; and
    a control circuit disposed at the accessory body and configured to transfer the electrical power to emit light from the accessory body,
    wherein the power transfer assembly transfers the electrical power to the accessory body responsive to installation in or operation of the vehicle,
    wherein the vehicle accessory and the accessory body are flexible, and
    wherein the control circuit is printed via conductive ink printing to maintain flexibility.

15. The vehicle accessory of claim 14, wherein the control circuit transfers the electrical power to excite an electroluminescent material to emit light.

16. The vehicle accessory of claim 15, wherein the vehicle accessory includes a battery that receives and stores the electrical power transferred by the power transfer assembly, and
    wherein the vehicle accessory utilizes the electrical power stored in the battery to excite the electroluminescent material.

17. The vehicle accessory of claim 13, wherein the electroluminescent material is applied on a layer of the accessory body via a coating, and
    wherein the coating is waterproof.

18. A vehicle accessory for a vehicle, the vehicle accessory comprising:
    an accessory body configured to operably couple to the vehicle;
    a power source disposed at the accessory body to transfer electrical power to the accessory body;
    an electroluminescent material disposed at the accessory body to emit light when powered, and
    a control circuit disposed at the accessory body and configured to transfer the electrical power to the electroluminescent material,
    wherein the power source transfers electrical power to the accessory body responsive to installation in the vehicle, operation of the vehicle, or an illumination trigger,
    wherein the electrical power excites the electroluminescent material to emit light, wherein the vehicle accessory and the accessory body are flexible, and wherein the control circuit is printed via conductive ink printing to maintain flexibility.

19. The vehicle accessory of claim 18, wherein the vehicle accessory is formed via an additive manufacturing process, wherein the control circuit and the electroluminescent material are added after formation of the accessory body during the additive manufacturing process.

* * * * *